United States Patent
Bloomberg et al.

[19]

[11] Patent Number: 5,960,161
[45] Date of Patent: Sep. 28, 1999

[54] CIRCUIT FOR ADAPTING 4-COLOR IMAGE SIGNALS TO AN 8-COLOR DIGITAL PRINTING APPARATUS

[75] Inventors: Steven J. Bloomberg, Mendon; Jefferey J. Gauronski, Rochester, both of N.Y.

[73] Assignee: Xerox Corporation, Stamford, Conn.

[21] Appl. No.: 08/827,590

[22] Filed: Mar. 28, 1997

[51] Int. Cl.$^6$ .......................... B41B 15/00; G01D 15/16; G01D 11/00; B41J 2/17
[52] U.S. Cl. ................. 395/109; 395/109; 346/140.1; 346/45; 346/46; 347/98; 347/100; 347/96
[58] Field of Search .................. 395/109; 346/140.1, 346/45, 46; 347/102, 43, 87, 15, 96, 19, 7, 98, 100; 358/298, 296, 75, 77, 78, 79

[56] References Cited

U.S. PATENT DOCUMENTS

| | | | |
|---|---|---|---|
| 4,222,060 | 9/1980 | Sato et al. | 347/9 |
| 4,479,242 | 10/1984 | Kurata | 382/17 |
| 4,517,590 | 5/1985 | Nagashima et al. | 358/75 |
| 4,614,967 | 9/1986 | Sayanagi | 358/75 |
| 4,718,040 | 1/1988 | Ayata et al. | 364/900 |
| 4,803,496 | 2/1989 | Kawakami et al. | 346/76 PH |
| 4,893,179 | 1/1990 | Ito | 358/79 |
| 5,623,294 | 4/1997 | Takizawa et al. | 347/98 |

*Primary Examiner*—Edward L. Coles
*Assistant Examiner*—Twyler Lamb
*Attorney, Agent, or Firm*—R. Hutter

[57] ABSTRACT

In an ink-jet printing apparatus, an arrangement of logic gates disposed between a source of rasterized image signals and printing hardware allows real-time conversion of CMYK image signals for application to an ink-jet printhead which is capable of CMY, RGB, and process and pure black outputs.

11 Claims, 2 Drawing Sheets

CIRCUIT FOR ADAPTING 4-COLOR IMAGE SIGNALS TO AN 8-COLOR DIGITAL PRINTING APPARATUS

FIELD OF THE INVENTION

The present invention relates to a circuit for processing image signals in a digital printing apparatus, such as a color ink-jet printer. More specifically, the present invention relates to a circuit for converting basic primary-color image signals to image signals suited for the colorant set of a particular printing apparatus.

BACKGROUND OF THE INVENTION

Use of ink-jet printing apparatus for creating color images based on digital image data is well-known. Basically, color ink-jet printing apparatus include printheads, or portion of a single printhead, each dedicated to placing ink (or, more generally, "colorant") at specific locations on a print sheet in accordance with the digital image data. In most basic digital color printers, the primary colorants available to be placed at various locations on the print sheet, which correspond to different types of signal accepted by the printing apparatus, correspond to the subtractive primary colors cyan, magenta, and yellow. Further, most commercially-available ink-jet printing apparatus further include a special printhead or portion of a printhead dedicated to placing pure black ink in desired locations on the print sheet, either as part of a full-color picture to be printed, or to print text. Less expensive types of color printing apparatus, in some circumstances, print a "process black" by combining the cyan, magenta, and yellow ink on the same location on the print sheet, the combination of these inks generally forming a black area.

A common concern in ink-jet printing is the deleterious effects of placing too much liquid ink in a given small print area on the print sheet. Placement of a large quantity of liquid ink on a specific location on a print sheet will cause the paper fibers on the print sheet to be oversaturated with liquid ink, and this oversaturation is the source of many possible print defects. For example, placing a large quantity of liquid in a small print area will require an appreciable amount of time for the liquid ink to evaporate out of the paper fibers; if the liquid ink does not evaporate from the paper fibers quickly enough, it is likely that the still-liquid ink will be smudged as the sheet moves further through the apparatus. Further, even if the liquid ink dries sufficiently, paper which has been wet and then dry will inevitably show "cockle," which is the bending and bubbling of paper caused by different portions of the paper drying unevenly. The problems of smudging and cockling occur even when very small amounts of liquid ink is placed on a print sheet, but the problems become particularly acute when a number of droplets of different primary colors are placed in close proximity on a print sheet in order to obtain a particular desired hue.

One possible way of minimizing the amount of liquid ink placed in a small area on a print sheet is to make available, in addition to the additive primary colors, a set of secondary colors which can be selectively placed on the print sheet, the secondary colors representing in effect "pre-mixed" combinations of the primary color. As it happens, these secondary colors are typically additive primary colors, such as red, green, and blue. By placing one of these secondary colors at a required location on the print sheet, one droplet of the secondary color can do the work of two droplets of primary colors, thus "saving" having to place three droplets of ink on a particular location.

Another design consideration known in ink-jet printing is to distinguish between two specific types of "black," either a "pure black" or a "process black." Even in printing apparatus in which a separate black in is available for printing text, in some situations this pure black, which is intended not to be mixed with other inks in close proximity thereto on the print sheet, is of a slightly different hue than would be a "process black" created by the intermixing of the primary color inks on the print sheet. A pure black, such as to print text, used to create dark areas in a photograph has been known to create a noticeable print artifact. Thus, it is a design option in ink-jet printing apparatus to distinguish between the requirement of a pure black, such as to print text by itself, and the process black, which would be used to create, for example, dark areas in reproducing a color photograph.

Given the considerations of using secondary colors to avoid having to place large amounts of liquid on small areas in the print sheet, and also the desire to make available both pure black and process black ink, an effectively "eight-color" ink-jet printing apparatus can be imagined. This printing apparatus would include not only the availability of subtractive primary colors, cyan, magenta, and yellow (CMY) but also the secondary colors red, green, and blue (RGB) as well as a pure black $K_1$ and a process black $K_2$ which is a pre-mixed set of the CMY colorants, which will fit in with images created with the CMY colorants. It is thus possible to create a $CMYRGBK_1K_2$ eight-color digital printing apparatus. Given this availability of hardware, consideration must be given to the fact that, in most available image-rendering schemes, every full-color image comprises only four primary color sub-images, CMYK (with no distinguishing between process black and pure black). It is thus a function of the present invention to provide hardware in which original CMYK image signals can be converted for use in an eight-color $CMYRGBK_1K_2$ eight-color printing apparatus.

DESCRIPTION OF THE PRIOR ART

In the prior art, U.S. Pat. No. 4,479,242 discloses a dichromatic reading device, in which a difference is taken between output signals from a first image sensor receiving reflected light directly and a second image sensor receiving the reflected light passed through a filter which blocks a specific color component of the reflected light. The two outputs are NANDed to provide information about a second color.

U.S. Pat. No. 4,517,590 discloses a color printing apparatus including a scanner for scanning a color document and converting the reflecting light from the color document into color image signals of black, red, green, and blue. A thermal head unit is driven by signals corresponding to complementary colors of the color signals from the scanner, for use in a printer which places magenta, yellow, and cyan ink on a print sheet.

U.S. Pat. No. 4,718,040 discloses a printing apparatus in which color portions of an image are automatically reproduced with lower resolution than black portions of an image.

U.S. Pat. No. 4,803,496 discloses a method of recording a full-color image for use in a digital printer. For black areas of the rendered image, the black ink is printed in an area smaller than the area in which the color inks are superimposed.

U.S. Pat. No. 4,893,179 discloses a digital color copying machine. A decomposing circuit decomposes the original color images into three fundamental colors and generates respective digital color signal. A circuit extracts a black component and one signal with the greatest density level from the three digital color signals and a first signal corresponding to the black component of the original image.

SUMMARY OF THE INVENTION

According to the present invention, there is provided a digital printing apparatus for accepting digital image data including a first primary color signal and a second primary color signal to create an image in a plurality of pixel spaces. The digital printing apparatus is capable of placing in a pixel space a colorant corresponding to the first primary color signal, a colorant corresponding to the second primary color signal, and a colorant of a first secondary color. A first gate receives the first color signal and the second color signal, and determines whether both the first primary color signal and the second primary color signal are associated with a selected pixel space according to the digital image data. Means, including at least a second gate, determine whether no other color signal besides the first primary color signal and the second primary color signal are associated with the selected pixel space according to the digital image data. Means are provided for outputting a secondary color signal, thereby placing the colorant of the first secondary color in the selected pixel space, if the first primary color signal and the second primary color signal are associated with the pixel space and no other color signal besides the first primary color signal and the second primary color signal are associated with the selected pixel space.

According to another aspect of the present invention, there is provided a digital printing apparatus for accepting digital image data including a first primary color signal, a second primary color signal, and a third primary color signal to create an image in a plurality of pixel spaces. The digital printing apparatus is capable of placing in a pixel space a colorant corresponding to the first primary color signal, a colorant corresponding to the second primary color signal, a colorant corresponding to the third primary color signal, and a colorant of a first secondary color. A first gate receives the first color signal and the second color signal, and determines whether both the first primary color signal and the second primary color signal are associated with a selected pixel space according to the digital image data. A second gate receives the second primary color signal and the third primary color signal, and determines whether both the second primary color signal and the third primary color signal are associated with a selected pixel space according to the digital image data. Means, including at least a third gate associated with the first gate and the second gate, determine whether no other color signal besides the first primary color signal, the second primary color signal, and the third primary color signal are associated with the selected pixel space according to the digital image data. Means are provided for outputting a secondary color signal, thereby placing the colorant of the first secondary color in the selected pixel space, if the first primary color signal, the second primary color signal, and the third primary color signal are associated with the pixel space and no other color signal besides the first primary color signal, the second primary color signal, and the third primary color signal are associated with the selected pixel space.

DETAILED DESCRIPTION OF THE INVENTION

Figure 1:
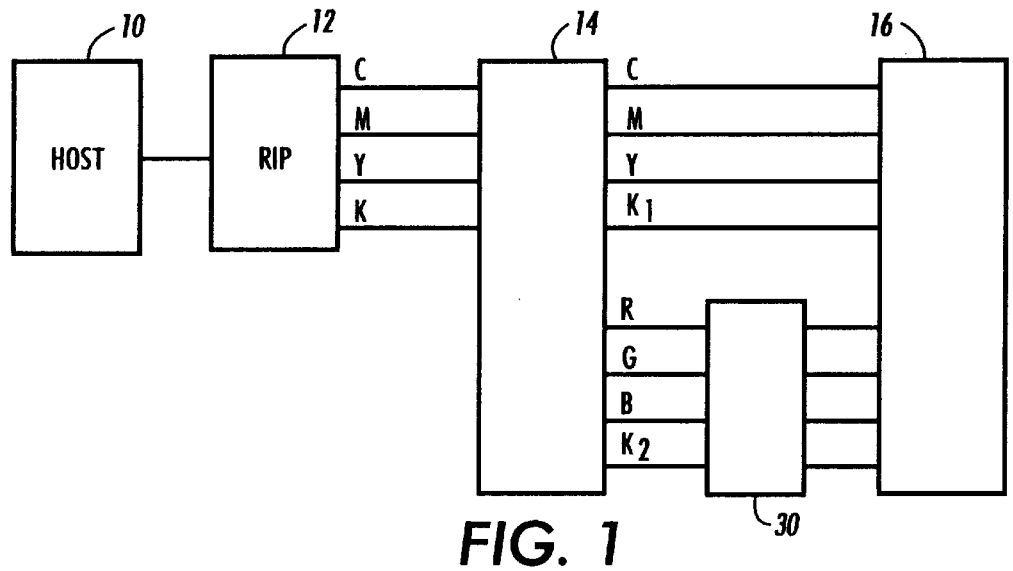
FIG. 1 is a diagram of a host computer and a digital printing apparatus incorporating the present invention.

FIG. 1 is a simplified systems view of the essential components of an eight-color "hi-fi" printing apparatus for creating full-color images from digital image data. The digital image data typically originates from a host computer, here indicated as 10, which can be the familiar personal computer or a hard-copy scanner, as is known in the art. The host computer 10 then sends image data, which may be in the form of a page description language such as Adobe® PostScript™ or PCL, or another format such as TIFF, to a raster image processor indicated as 12. As is known in the art the general function of a raster image processor is to derive from the original data a number of data sets, each data set corresponding to one primary color forming the desired color image. In most known raster image processors for printing color images, there is created by the processor four image separations, each separation corresponding to one subtractive primary color, that is, cyan, magenta, and yellow, along with a separate separation for those parts of the image intended to be printed in pure black, such as text (dark areas of a full-color image, such as a photograph, are typically created by simultaneous high-density signals from each of the cyan, magenta, and yellow separations in a particular area). As is well known, the variously-colored droplets are placed, according to digital image data, on an array of small areas on a print sheet, here called "pixel areas," because each small area corresponds to one pixel, to make a desired full-color image on the sheet.

The CMYK signals from the various separations are, according to the present invention, then fed into what is here called a "converter" 14. As can be seen in FIG. 1, while the inputs of converter 14 are the signals from CMYK separations, there are eight distinct outputs: CMY outputs, RGB outputs, and two black outputs, $K_1$ and $K_2$. As mentioned above, what are here called the "secondary" color signals, in this case RGB, have the purpose of allowing substitutions of a single droplet of the secondary colorant, such as red, in lieu of having to combine separate droplets of the primary color colorant, such as magenta plus yellow, "saving" having to place two droplets of liquid colorant on the sheet where one will do. This saving of a droplet of liquid ink will improve the final print quality by lessening the possibility of smudging of partially-dried liquid ink, and also lessen the cockle caused by the evaporation of relatively large amounts of liquid ink from the paper fibers.

The two types of black ink, $K_1$ and $K_2$, shown in FIG. 1 represent, respectively, a "process" black, and a "pure" or mono-color black. The process black is typically formed by a chemical mixture of the CMY colorants, and is used in situations where there are dark areas of a full-color image such as a photograph. This process black, because it is chromatically related to the CMY colorants, will have a more natural palette relative to primary colors immediately adjacent thereto in the final image, and therefore will blend more readily with the neighboring primary colors. In contrast, the pure or mono-color black may be optimized for the printing of black-only areas, particularly of text. Typically, but not necessarily, the pure black $K_2$ may be tolerant of a longer evaporation time, because it will be known in advance that the pure black will never be placed immediately adjacent an area of another colorant, thus avoiding the risk of intermingling with other inks on the print sheet before evaporation.

In summary, the overall purpose of converter 14 is to take the original CMYK separations from the raster image processor 12, and then redirect the signals therefrom, on a pixel-by-pixel basis, to allow substitution, where possible, of a single secondary colorant droplet instead of two or more primary-colorant droplets. The printhead 16, as shown in FIG. 1 (which may, depending on a particular architecture of an ink-jet printing apparatus, comprise multiple physically separate printheads) includes the capability of selectably placing, on any particular pixel area on a print sheet, CMY colorants, RGB colorants or one of the black colorants $K_1$ or $K_2$. Assuming that all droplets of every particular color are substantially of the same volume per pixel area, this substitution of a secondary color droplet for two or more primary color droplets per pixel represents a significant saving of colorant placed on the sheet.

(There may further exist a buffering device 30 between the converter 14 and the ejectors for some or all of the different colors in printhead 16, as will be explained in detail below.)

Figure 2:
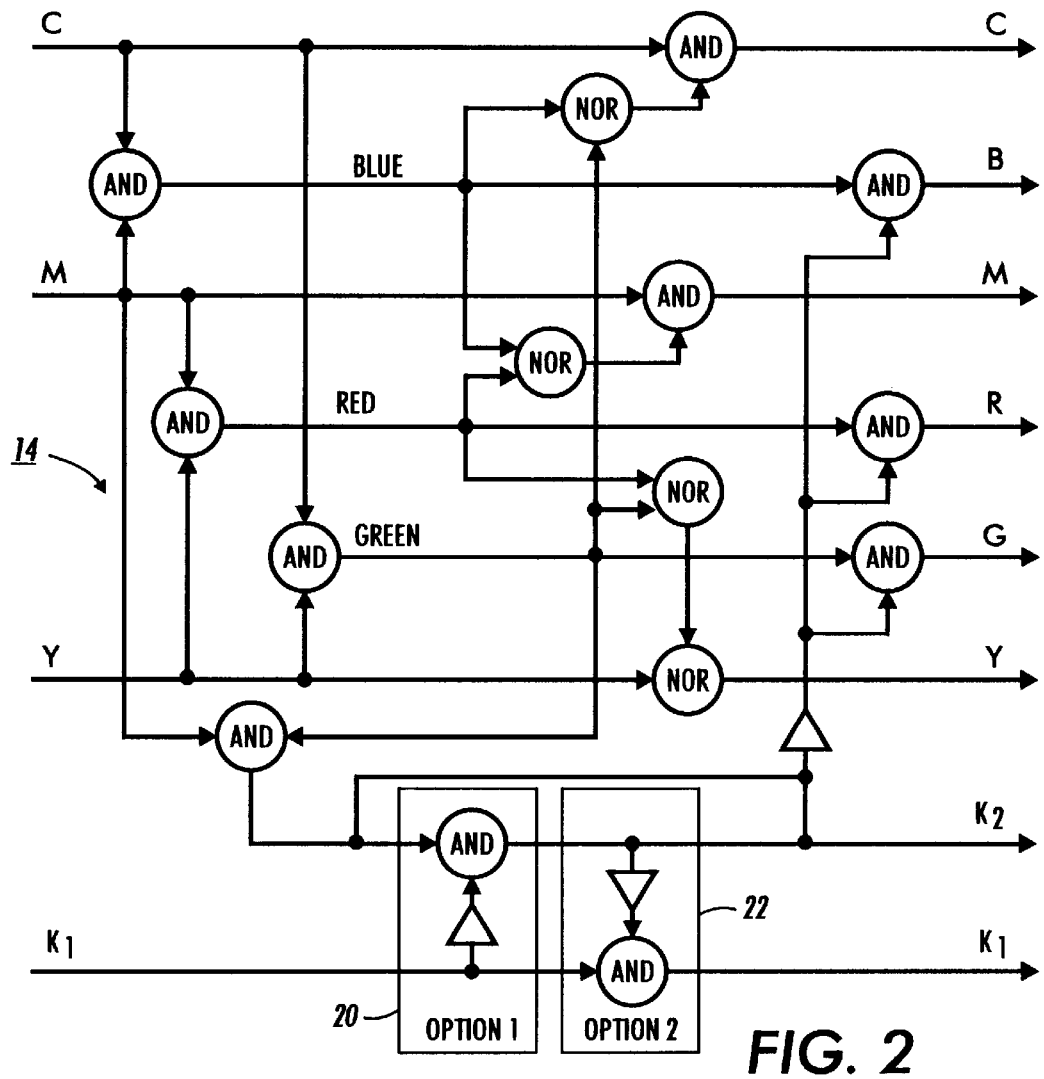
FIG. 2 is a logic-gate diagram of an embodiment of the present invention.

FIG. 2 is a logic diagram, which can readily be implemented in hardware by person of skill in the art, showing the operation of converter 14 in FIG. 1. It will be noted that on the left of the Figure, the inputs of CMYK can be fed each on a separate line, while, on the right of the Figure, separate lines are provided for each of the eight possible outputs as shown in FIG. 1. Because the converter 14 is preferably implemented in digital hardware, it is expected that, in real time, the inputs to the converter 14 will be the set of regular CMYK signals (0 or 1) required to create a particular color in a particular pixel-size area on the print sheet when the printhead 16 is accessing that particular small area on the print sheet (the timing will, of course, take in to account the fact that, in many ink-jet printer architectures, the same printhead will pass over the same general area of the print sheet numerous times, each time a different color ejector accessing a particular pixel area.

Looking at the arrangement of logic gates within converter 14, the overall function of the converter can be determined. For example, taking one set of colors, in a situation where a particular pixel size area in an image to be printed requires a blue color, with the basic CMYK color separations, that pixel area would ordinarily require the combination of a cyan and magenta colorant to obtain the desired blue. With the converter of the present invention, however, when the situation is detected where a cyan and magenta colorant is required in the same pixel area, the converter 14 will substitute for those two colorants a single droplet of pure blue colorant from printhead 16. As shown in the Figure, an AND gate between the cyan and magenta input line will cause a single blue droplet to be ejected. Simultaneously, if this blue droplet is intended to be ejected, the blue line further includes provisions, in the form of the NOR gates branching off of the blue line as shown in the Figure, for suppressing the cyan and magenta signal (i.e., preventing those signals from operating ejectors in the printhead) in those situations in which the blue droplet is substituted therefor. As further can be seen in the arrangement of gates in the Figure, this principle of substituting a secondary BGR color for combinations of two CMY colors applies for red and green as well.

The basic circuit shown in FIG. 2 also includes provisions for substituting a process black, here indicated as $K_1$, in those situations where a cyan, magenta, and yellow droplets are simultaneously required according to the image data. Looking at the $K_1$ line in the Figure, it can been that this output line is activated upon receiving a signal on the magenta input line and from the green output line. This arrangement makes sense because green is the secondary colorant required by a combination of cyan and yellow; thus if both green and magenta are required in a particular pixel area, this is in effect the same as saying that all three of cyan, magenta, and yellow are required in the pixel area, and therefore this would be a situation where the process black is desired. Once again, according to the present invention, one droplet of process black $K_1$ will thus be placed in the pixel area in lieu of one droplet each of the cyan, magenta, and yellow, thus, "saving" two droplets of liquid ink in the pixel area.

With further reference to FIG. 2, there are shown two alternate gate configuration for the relationship of process black $K_1$ and pure black $K_2$ outputs relative to the process black and basic K signal from the color separations. If the configuration shown in the block marked 20 is selected for the design of converter 14, a pure black K signal in the original image (such as would be used to print black text) would simply be used to "pass through" to activate the $K_2$ pure black color. The process color black $K_1$ would be activated only in situations where the three primary colorants cyan, magenta, and yellow are required on the input side, and the pure black is not required in the K separation. If the option of the gates shown in block 22 are incorporated in the design, an original K separation on the input side will be passed through and rendered as a pure black $K_2$ on the output side, providing only that there are no additional requirements for a process black caused by the necessity for additional cyan, magenta, or yellow signals. Whether the design option shown in block 20 or block 22 is chosen will depend on design considerations, in particular, whether the original CMYK signal incorporates substitution of a K signal for CMY signals (generally known as "undercolor removal") in the original data or not. If the K signal is already substituted for dark areas created by the CMY signals, then the option of block 20 would be selected, because the image data have already taken into account the fact that a pure black has been substituted for a CMY area.

Figure 3:
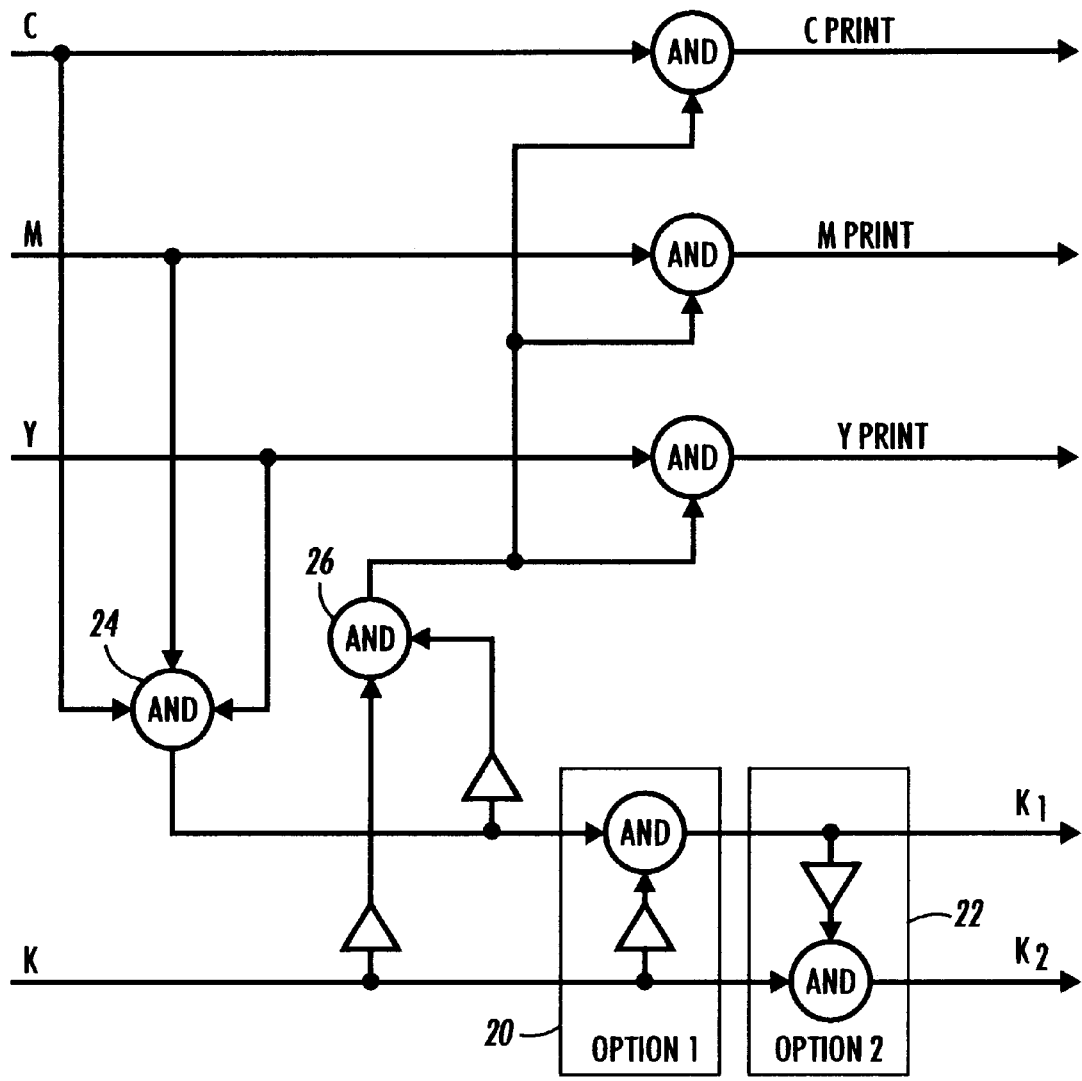
FIG. 3 is a logic-gate diagram of another embodiment of the present invention.

FIG. 3 is a diagram of an alternate embodiment of the present invention, wherein original CMYK signals on the input side are reconfigured not into an eight-color set of signals on the output side, as in FIG. 2, but rather only in a five-color output, with the option of the original K signals on the input side being rendered as either a process black or a pure black, as above. In FIG. 3, the design options 20, 22 are the same as in the FIG. 2 embodiment. In FIG. 3, the AND gate 24 is sensitive to situations in which all three cyan, magenta, and yellow signals are required in a particular pixel area; the requirement of all three colorants causes the substitution therefor of a single process black droplet to $K_1$, while simultaneously, through AND gate 26, suppressing the ejection of the cyan, magenta, or yellow droplets. Simultaneously, for original black signals entering on the input side, the original K signal is rendered as (depending upon the design option) a process black $K_1$ or a pure black $K_2$, while once again suppressing any simultaneous CMY signal.

It will be apparent that the real-time passage of image signal through the converter 14 will affect the output of the various colorant-capable ejectors within a printhead such as 16. The particular architecture of an ink-jet printer, with the array of ejectors being placed either on a scanning carriage, or in a page-width, multi-array arrangement, will affect the time lag between a particular set of signals passing through the converter 14, and the output signals from converter 14 causing an ejection in one or another ejector in the printhead 16. It will thus be apparent to one of skill in the art that any number of buffers or delay devices may be required on different output lines of converter 14, so that the proper droplet is ejected onto the sheet when the ejector capable of producing that droplet is placed correctly relative to the small area on the sheet. For example, if one linear array of ejectors for outputting CMY droplets are in one location at any time relative to a sheet, and the ejectors for emitting the RGB droplets are at a fixed separate location from the CMY ejectors, there will be fixed time lag between the time that a CMY ejector is accessing a particular small area on the sheet, and the RGB ejector is accessing the same small area. In order to compensate for this time lag, a time buffer, generally indicated as 30 in FIG. 1, is incorporated between converter 14 and some or all the various ejectors in the printhead 16, in those situations where an RGB signal is determined to be required, so that the RGB and, if necessary, K1 or K2 ejectors will be at the correct location for ejecting the selected substitute droplet at a given time. Different buffering or delay systems will be apparent depending on a particular architecture of the printing apparatus.

While the invention has been described with reference to the structure disclosed, it is not confined to the details set forth, but is intended to cover such modifications or changes as may come within the scope of the following claims.

We claim:

1. A digital printing apparatus for accepting digital image data including a first primary color signal and a second primary color signal to create an image in a plurality of pixel spaces, the digital printing apparatus being capable of placing in each pixel space a colorant corresponding to the first primary color signal, a colorant corresponding to the second primary color signal, and a colorant of a first secondary color, the secondary color representing a combination of a colorant corresponding to the first primary color signal and a colorant corresponding to the secondary color signal, comprising:

a first gate for receiving the first primary color signal and the second primary color signal, and determining whether both the first primary color signal and the second primary color signal are associated with a same pixel space according to the digital image data;

means, including at least a second gate, for determining whether no other color signal besides the first primary color signal and the second primary color signal are associated with the selected pixel space according to the digital image data; and means for outputting a secondary color signal, thereby placing the colorant of the first secondary color in the selected pixel space, if the first primary color signal and the second primary color signal are associated with the pixel space and no other color signal besides the first primary color signal and the second primary color signal are associated with the selected pixel space, thereby avoiding a superposition of primary colorants in the same pixel space.

2. The apparatus of claim 1, further comprising means, associated with outputting the secondary color signal, for suppressing the first primary color signal and second primary color signal.

3. The apparatus of claim 1, further comprising means for selectably placing a predetermined volume of colorant corresponding to the first primary color signal on a pixel area, and means for selectably placing a substantially equal predetermined volume of colorant of the first secondary color signal on a pixel area.

4. The apparatus of claim 1, further comprising a buffer for delaying outputting the secondary color signal relative to receiving the first color signal and the second color signal.

5. A digital printing apparatus for accepting digital image data including a first primary color signal, a second primary color signal, and a third primary color signal, to create an image in a plurality of pixel spaces, the digital printing apparatus being capable of placing in each pixel space a colorant corresponding to the first primary color signal, a colorant corresponding to the second primary color signal, a colorant corresponding to the third primary color signal, and a colorant of a first secondary color, the secondary color representing a combination of a colorant corresponding to the first primary color signal and a colorant corresponding to the secondary color signal, comprising:

a first gate for receiving the first primary color signal and the second primary color signal, and determining whether both the first primary color signal and the second primary color signal are associated with a same pixel space according to the digital image data;

a second gate for receiving the third primary color signal and the second primary color signal, and determining whether both the first primary color signal and the second primary color signal are associated with the same pixel space according to the digital image data; and means, including at least a third gate associated with the first gate and the second gate, for outputting a secondary color signal, thereby placing the colorant of the first secondary color in the selected pixel space, if the first primary color signal, second primary color signal, and third primary color signal are all associated with the selected pixel space, thereby avoiding a superposition of primary colorants in the same pixel space.

6. The apparatus of claim 5, further comprising means, associated with outputting the secondary color signal, for suppressing the first primary color signal, second primary color signal, and third primary color signal.

7. The apparatus of claim 5, further comprising means for selectably placing a predetermined volume of colorant corresponding to the first primary color signal on a pixel area, and means for selectably placing a substantially equal predetermined volume of colorant of the first secondary color signal on a pixel area.

8. The apparatus of claim 5, the first secondary colorant being a substantially black combination of the colorant corresponding to the first primary color signal, the colorant corresponding to the second primary color signal, and the colorant corresponding to the third primary color signal.

9. The apparatus of claim 5, further comprising means for accepting an original black primary color signal; and means for outputting the secondary color signal in a pixel space in response to an original black primary color signal for the pixel space.

10. The apparatus of claim 5, further comprising means for accepting an original black primary color signal; and means for suppressing the secondary color signal in a pixel space in response to an original black primary color signal for the pixel space.

11. The apparatus of claim 5, further comprising a buffer for delaying outputting the secondary color signal relative to receiving the first color signal and the second color signal.

\* \* \* \* \*